(12) United States Patent
Zhou et al.

(10) Patent No.: US 9,059,834 B2
(45) Date of Patent: Jun. 16, 2015

(54) METHOD AND ALGORITHM FOR STABILIZING THE OUTPUT STATE OF AN OPTICAL TRANSCEIVER

(71) Applicants: Xiaojun Zhou, Chengdu (CN); Meiling Lu, Chengdu (CN); Xiaoyi Zheng, Chengdu (CN); Jifeng Wan, Chengdu (CN)

(72) Inventors: Xiaojun Zhou, Chengdu (CN); Meiling Lu, Chengdu (CN); Xiaoyi Zheng, Chengdu (CN); Jifeng Wan, Chengdu (CN)

(73) Assignee: Source Photonics, Inc., Chatsworth, CA (US)

( * ) Notice: Subject to any disclaimer, the term of this patent is extended or adjusted under 35 U.S.C. 154(b) by 274 days.

(21) Appl. No.: 13/728,788

(22) Filed: Dec. 27, 2012

(65) Prior Publication Data

US 2014/0140706 A1    May 22, 2014

(30) Foreign Application Priority Data

Nov. 20, 2012 (CN) .......................... 2012 1 0471553

(51) Int. Cl.
| | | |
|---|---|---|
| *H04B 10/00* | (2013.01) | |
| *H04B 10/06* | (2006.01) | |
| *H04L 7/00* | (2006.01) | |
| *H04B 10/079* | (2013.01) | |
| *H04B 10/61* | (2013.01) | |
| *H04B 10/43* | (2013.01) | |

(52) U.S. Cl.
CPC ............ *H04L 7/0083* (2013.01); *H04B 10/079* (2013.01); *H04B 10/616* (2013.01); *H04B 10/43* (2013.01)

(58) Field of Classification Search
CPC ........ H04B 10/07; H04B 10/79; H04B 10/40; H04B 10/43; H04B 10/60; H04B 10/616; H04B 10/69; H04B 17/00; H04B 17/004; H04B 17/0042; H04B 17/007; H04B 2001/06; H04B 2001/38; H04L 7/0079
See application file for complete search history.

(56) References Cited

U.S. PATENT DOCUMENTS

2004/0076119 A1* 4/2004 Aronson et al. ............... 370/249
2005/0111845 A1* 5/2005 Nelson et al. ................. 398/138

* cited by examiner

*Primary Examiner* — Darren E Wolf
(74) *Attorney, Agent, or Firm* — Andrew D. Fortney; Central California IP Group, P.C.

(57) ABSTRACT

The invention relates to a method and algorithm for stabilizing the output state of an optical transceiver. The method includes comparing a signal quality monitor (SQM) register value with a predetermined threshold. If the SQM register value is less than or equal to the predetermined threshold, a microcontroller unit (MCU) reads and determines the rx_lol state bit value of a clock and data recovery (CDR) chip. If the rx_lol state bit value reaches a low logic level value at least 3 times, the MCU converts the state bit values of rx_lol and mod_nr into low logic level values, or else, convert the state bit values of rx_lol and mod_nr into high logic level values. If the SQM register value is greater than the predetermined threshold then the state bit values of rx_lol and mod_nr will be left unchanged. When there is no data input to the CDR chip, the method of the present invention will maintain rx_lol and mod_nr at high or low logic level values to stabilize the output state of the optical transceiver.

20 Claims, 1 Drawing Sheet

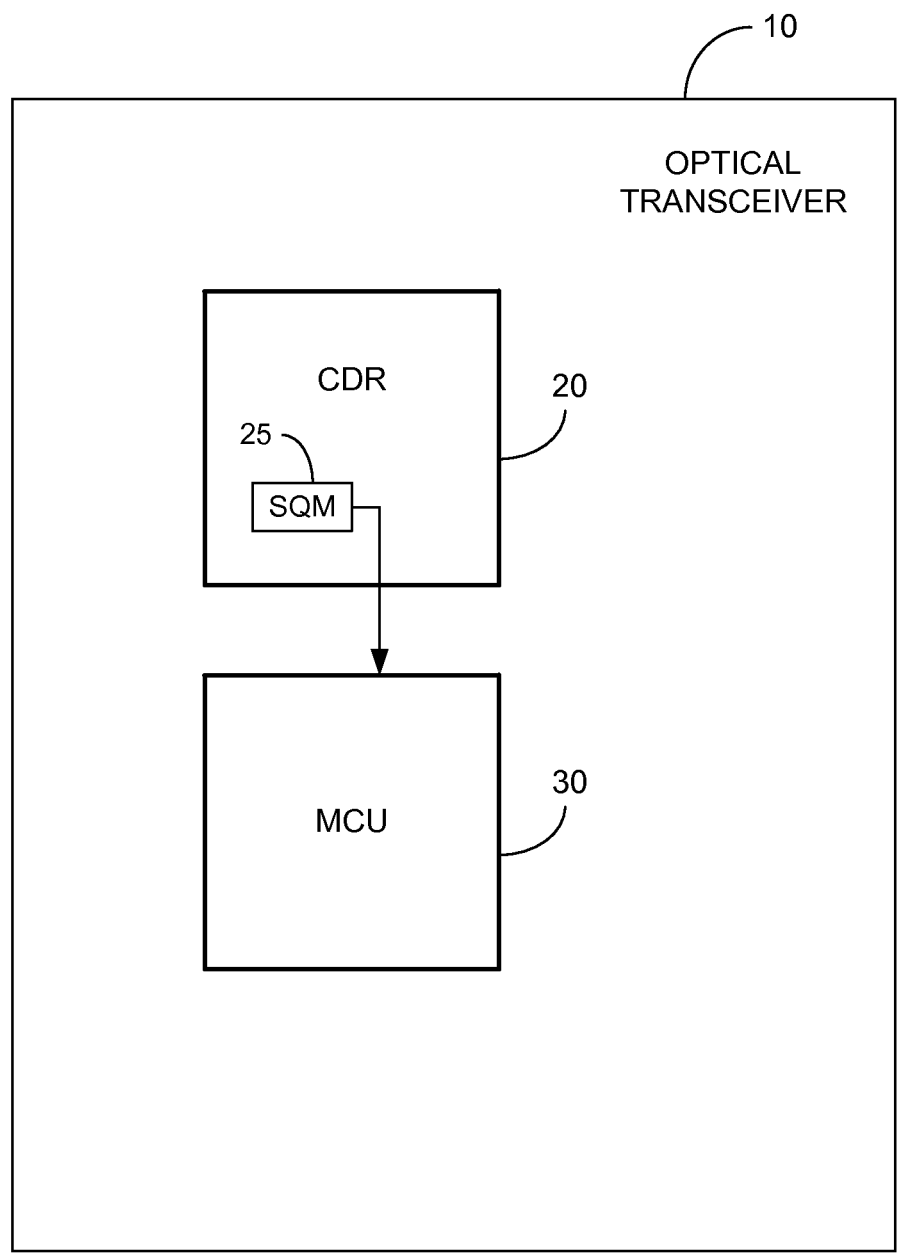

METHOD AND ALGORITHM FOR STABILIZING THE OUTPUT STATE OF AN OPTICAL TRANSCEIVER

CROSS REFERENCE TO RELATED APPLICATIONS

This application claims the benefit of Chinese Patent Application No. 201210471553.6, filed on Nov. 20, 2012, which is incorporated herein by reference in its entirety.

FIELD OF THE INVENTION

The present invention relates to the field of optical communication, and in particular, to a method and algorithm for stabilizing the output state of an optical transceiver.

DISCUSSION OF THE BACKGROUND

A clock and data recovery (CDR) chip is utilized to capture a clock signal from a received data signal. Data recovery includes regenerating the data signal utilizing a phase-comparison circuit to make sure that the clock signal is in phase synchronization with the data signal. CDR chips are widely used in optical transceivers, telecommunications and wireless products. Generally, CDR chips are used in small form-factor (SFF) modules based on the Lucent optical connector (LC) to replace discrete optical devices for the extraction of clock and recovery data. Rx_lol and mod_nr represent two state flag bits of the CDR chip. When there is no data input to the CDR chip, the state flag bit of rx_lol continuously varies between "0" and "1". As a result, the optical transceiver state bit of rx_lol is unstable. Because rx_lol is a trigger signal for mod_nr, the state bit of mod_nr also becomes unstable, thereby resulting in an unstable output display status of the optical transceiver that will influence the estimation of the working condition of the optical transceiver.

SUMMARY OF THE INVENTION

The present invention is intended to provide a method and algorithm for stabilizing the output state of an optical transceiver, thereby avoiding an unstable output state of the optical transceiver due to an unstable output state of a CDR chip when there is no data input to the CDR chip.

To implement the objective(s) of the present invention, one or more technical proposals are provided below.

A method for stabilizing the output state of an optical transceiver generally comprises (a) comparing a signal quality monitor (SQM) register value with a predetermined threshold; when the SQM register value is less than or equal to the predetermined threshold, the method proceeds to step (b), otherwise it ends; and (b) reading and determining a first state bit value of the CDR chip; when the first state bit value of the CDR chip reaches a low logic level at least 3 times, a microcontroller unit (MCU) converts the state bit values of the first state bit and a second state bit into low logic level values; otherwise, the state bit values of the first and second state bits are converted into high logic level values. Preferably, the predetermined threshold equals zero.

According to various embodiments of the present invention, the first state bit represents or indicates a receiver loss of data or loss of lock status (e.g., whether data is being received or may have been lost by the optical transceiver, or whether the CDR chip has lost a locked status in its clock recovery circuit; e.g., a rx_lol or rx_los bit), the second state bit represents or indicates that the optical transceiver module is not ready for use or operations (e.g., a mod_nr bit), and the predetermined time may vary between 100 and 200 ms, and in one example, may be 150 ms.

Relative to the prior art, the method of the present invention advantageously provides that when the SQM register value is less than or equal to the predetermined threshold (that is, there is no data input to the CDR chip), the MCU will keep the state bit values of the first and second state bits of the optical transceiver at low or high logic level values to stabilize the first and second state bits of the optical transceiver. Therefore, the output state of the optical transceiver is stabilized, and unstable output states of the optical transceiver due to the changing of the state bit values of the first and second state bits are avoided.

DETAILED DESCRIPTION

The technical proposal(s) of embodiments of the present invention will be fully and clearly described in conjunction with the following embodiments. It will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

In accordance with the present invention, a method for stabilizing the output state of an optical transceiver 10 may comprise comparing a register value (e.g., a signal quality monitor [SQM] register value) from a CDR chip 20 with a predetermined threshold (if the predetermined threshold is represented by the international reference alphabet [IRA], the IRA value may equal 0×00) in an optical transceiver; and reading and/or determining the first and second state bit numerical values (e.g., of rx_lol and mod_nr) of the CDR chip 20 when the register value is less than or equal to the predetermined threshold (e.g., 0×00). The register (e.g., the SQM register 25) is a register of the CDR chip 20. The value of the SQM register 25 will be equal to zero (i.e., 0×00) when there is no data input to the CDR chip 20. Therefore, the predetermined threshold must be set to zero to ensure stable output state of the optical transceiver 10 when there is no data input to the CDR chip 20.

The values of the first and second state bits may be read and/or determined within 150 ms. If the first state bit value of the CDR chip 20 reaches a low logic level (e.g., a binary zero) at least 3 times at least within a predetermined time period (e.g., 150 ms), the MCU 30 converts the state bit values of the first and second state bits to low logic level value (e.g., a binary "0"). Otherwise, the MCU 30 converts the state bit values of the first and second state bits to a high logic level value (e.g., a binary "1"). The first state bit may comprise a receiver loss of lock bit (e.g., rx_lol), and the second state bit may comprise a "module not ready" bit (e.g., mod_nr).

The first state bit value of the CDR chip 20 toggles between "0" and "1" when there is no data input to the CDR chip 20. When the receiver is not receiving data, the first state bit value of the CDR chip 20 generally reaches a low logic level at least 3 times within a time period of between 100 and 200 ms. The shorter the time spent reading the state bit values of the first state bit, the closer one approaches the validity of the value of the first state bit. However, another effect of a shorter read time is a greater influence on the visibility of the state bit value of the first state bit. Therefore, the time for reading the state bit values of the first state bit of the CDR chip 20 may preferably be set to 150 ms.

In the method or algorithm for stabilizing the output state of an optical transceiver 10 in accordance with the present invention, the MCU 30 keeps the state bit values of the first and second state bits of an optical transceiver 10 at low or high logic level values when the SQM register value is less or equal to the predetermined threshold, thereby stabilizing the state bit values of the first and second state bits of the optical transceiver 10. That is, the receiver data in the first and second status bit are stabilized when there is no data input to the CDR chip 20. In such a way, unstable output states of the optical transceiver 10 due to toggling or changing of the state bit numerical values of the first and second state bits can be eliminated, thereby avoiding unstable output display statuses of the optical transceiver 10 that will influence the estimation of the working condition of the optical transceiver 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for stabilizing an output state of an optical transceiver, comprising:
    a) comparing a signal quality value from a clock data recovery (CDR) chip with a predetermined threshold;
    b) reading and deteimining a receiver loss of lock bit value of the CDR chip when the signal quality value is less than or equal to the predetermined threshold;
    c) converting the receiver loss of lock bit value and a module not ready bit value into a low logic value when the receiver loss of lock bit value of the CDR chip reaches a low logic value n times within a predetermined time;
    d) converting the receiver loss of lock bit value and the module not ready bit value into a high logic value when the receiver loss of lock bit value of the CDR chip does not reach the low logic value n times within the predetermined time; and
    e) leaving the receiver loss of lock bit value and the module not ready bit value unchanged when the signal quality value is greater than the predetermined threshold.

2. The method of claim 1, wherein n is an integer equal to or greater than 3.

3. The method of claim 1, wherein the low logic value is a binary 0, and the high logic value is a binary 1.

4. The method of claim 1, wherein the signal quality value is from a signal quality monitor (SQM) register on the CDR chip.

5. The method of claim 1, wherein the predetermined threshold is 0.

6. The method of claim 1, wherein the predetermined time is between about 100 and 200 ms.

7. The method of claim 6, wherein the predetermined time is 150 ms.

8. The method of claim 4, further comprising reading and determining the receiver loss of lock bit value of the CDR chip, and keeping the receiver loss of lock and the module not ready bit values at low logic level values when the SQM register value is less or equal to the predetermined threshold, thereby stabilizing the receiver loss of lock and the module not ready bit values.

9. The method of claim 8, wherein the CDR chip has lost its clock recovery lock status or received no data when the receiver loss of lock bit value changes from a low logic level to a high logic level, or from a high logic level to a low logic level, at least n times within the predetermined time.

10. An optical transceiver, comprising:
    a) a clock data recovery (CDR) chip;
    b) a register comprising a receiver loss of lock bit and a module not ready bit; and
    c) a microcontroller unit (MCU) configured to:
        i) compare a signal quality value from the CDR chip with a predetermined threshold;
        ii) read and determine a value of the receiver loss of lock bit if the signal quality value is less than or equal to the predetermined threshold;
        iii) convert the receiver loss of lock bit value and a value of the module not ready bit into a low logic value when the receiver loss of lock bit value reaches the low logic value n times within a predetermined time;
        iv) convert the receiver loss of lock bit value and the module not ready bit value into a high logic value when the receiver loss of lock bit value does not reach the tow logic value n times within the predetermined time; and
        v) leave the receiver loss of lock bit value and the module not ready bit value unchanged when the signal quality value is greater than the predetermined threshold.

11. The optical transceiver of claim 10, wherein n is an integer equal to or greater than 3.

12. The optical transceiver of claim 10, wherein the low logic value is a binary 0, and the high logic value is a binary 1.

13. The optical transceiver of claim 10, wherein the register comprises a signal quality monitor (SQM) register on the CDR chip that stores the signal quality value.

14. The optical transceiver of claim 10, wherein the predetermined threshold is 0.

15. The optical transceiver of claim 10, wherein the predetermined time is between about 100 and 200 ms.

16. The optical transceiver of claim 15, wherein the predetermined time is 150 ms.

17. The optical transceiver of claim 10, wherein the microcontroller unit (MCU) is configured to read and determine the receiver loss of lock bit value when there is no data input to the CDR chip or the CDR chip has lost clock recovery lock status.

18. The optical transceiver of claim 17, wherein no data has been received by the CDR chip when the receiver loss of lock bit value changes from the low logic level to the high logic level, or from the high logic level to the low logic level, at least n times within the predetermined time.

19. The method of claim 4, wherein n is 3.

20. The optical transceiver of claim 17, wherein n is 3.

* * * * *